(12) United States Patent
González (10) Patent No.: US 11,059,691 B2
(45) Date of Patent: Jul. 13, 2021

(54) CONTAINER WITH ANTI-WIRE-ENTANGLING DEVICE FOR PACKAGING AND PAYING OUT COILED WELDING WIRE

(71) Applicant: Plasticos y Alambres, S.A. DE C.V., Garcia (MX)

(72) Inventor: Ricardo Cantú González, San Pedro Garza García (MX)

(73) Assignee: PLASTICOS Y ALAMBRES, S.A. DE C.V., Nuevo Leon (MX)

( * ) Notice: Subject to any disclaimer, the term of this patent is extended or adjusted under 35 U.S.C. 154(b) by 159 days.

(21) Appl. No.: 16/435,117

(22) Filed: Jun. 7, 2019

(65) Prior Publication Data
US 2020/0385232 A1    Dec. 10, 2020

(51) Int. Cl.
*B65H 57/18* (2006.01)
*B65H 49/08* (2006.01)
*B65H 57/06* (2006.01)

(52) U.S. Cl.
CPC ............. *B65H 57/18* (2013.01); *B65H 49/08* (2013.01); *B65H 57/06* (2013.01); *B65H 2701/36* (2013.01)

(58) Field of Classification Search
CPC .... B65H 57/18; B65H 49/08; B65H 2701/36; B23K 9/1333
See application file for complete search history.

(56) References Cited

U.S. PATENT DOCUMENTS

| | | |
|---|---|---|
| 1,952,056 A | 3/1934 | Cook |
| 2,864,565 A | 12/1958 | Whearley |
| 4,869,367 A | 9/1989 | Kawasaki et al. |
| 5,105,943 A | 4/1992 | Lesko et al. |
| 5,277,314 A | 1/1994 | Cooper et al. |
| 5,495,160 A | 2/1996 | Gelmetti |
| 5,690,225 A | 11/1997 | Lutz et al. |
| 5,746,380 A | 5/1998 | Chung |
| 5,758,834 A | 6/1998 | Dragoo et al. |
| 5,819,934 A | 10/1998 | Cooper |
| 5,845,862 A | 12/1998 | Cipriani |
| 6,237,768 B1 | 5/2001 | Cipriani |
| 6,481,575 B2 | 11/2002 | Cipriani |
| 6,547,176 B1 | 4/2003 | Blain et al. |
| 6,550,708 B2 | 4/2003 | Messier |
| 6,857,521 B2 | 2/2005 | Cantu-Gonzalez |

*Primary Examiner* — William E Dondero
(74) *Attorney, Agent, or Firm* — Haug Partners LLP (57) ABSTRACT

A container for transporting, storing, and/or paying-out welding wire from a contained wire coil without tangling, and having flexible straps each extending between the lowermost and upper parts of the container wall passing through a second opening of an anti-entangling device and along a path between said wire coil and said wall. The anti-entangling device rests on the top of the wire coil and descends by gravity as the welding wire is paid-out. The anti-entangling device has a first opening through which said wire passes and respective second openings through each of which a flexible strap passes. The second openings are opposingly located in the anti-entangling device loop about the device's first central opening so that the flexible straps are positioned by the second openings to contact the top surface of the wire coil.

15 Claims, 6 Drawing Sheets

CONTAINER WITH ANTI-WIRE-ENTANGLING DEVICE FOR PACKAGING AND PAYING OUT COILED WELDING WIRE

FIELD OF INVENTION

The invention relates to a container and an anti-wire-entangling device used to package and pay out welding wire to feed welding machines. More particularly, the invention comprises a welding wire container having such an anti-entangling device that prevents the coil of wire from becoming entangled and further aids by improved retention of the coiled shape during its transport, storage and use during pay out of the wire from the container.

BACKGROUND OF THE INVENTION

Welding wire for continuous welding machines is packaged, transported, and handled in large quantities in the form of a stacked coil of vertically laid wire loops in a container, typically a cylindrical drum but which may also have a polygonal cross-section, for example squared, octagonal, or hexagonal. The wire is laid into the container from a winding machine as a vertical stack of superposing off-centered wire loops that form a wire coil generally taking the form of a cylinder having a central open cavity.

The automatic welding process requires that the welding wire be continuously fed to the welding machines. Therefore, one of the most important of the quality characteristics is that the welding wire must be easily and reliably payed out from the container (in which it is packaged) up to a point (where it is consumed) in a very smooth and fluid manner without interruptions that may disrupt the welding work and thus adversely affect the productivity of said welding process (typically because the welding process must be stopped to fix the entangled wire or even may have to prematurely substitute the incompletely-emptied wire container in use by a new wire container to free up the entangling problems). Also, even during transportation and handling of the welding wire containers, the single loop spirals of the coil may be jostled and lose the original order of the stack of wire loops forming the wire coil with the consequence that the wire may thus become tangled (especially when subsequently being payed out of the container).

Non-entangling or minimum entangling of coiled welding wire is therefore a competitive advantage and a highly valued quality parameter for welding wire consumers and manufacturers.

The wire from the wire winding machine tends to loop in a circular shape; however, it is within the scope of the invention to have the wire loops and the container take other forms, such as elliptical. The wire winding machine may also be adjusted to form such a stack of wire loops so that said loops are superposed to form the central cavity of a desired diameter. Normally, the loops will always be generally circular unless the wire is wound over a core, or within a container, having a specific form.

To prevent wire entangling problems, welding wire manufacturers usually provide an anti-entangling device positioned at the upper surface of the coil which exerts a downward pressure over said coil against the bottom of the container; thus holding the wire loops of the coil in place and at the same time allowing said wire to be withdrawn from the top surface of the coil. The downward pressure may be exerted for example by the weight of the anti-entangling device, or by adding weights to such anti-entangling device, or by attaching magnets to the anti-entangling device to exert a magnetic force on the wire.

During transportation of the wire containers, additional downward pressure may be exerted for example by means of an elastic band having one end anchored at the bottom of the container and the other end tied to said anti-entangling device, and/or by the weight of the anti-entangling device.

In the prior art, a number of different kinds of containers and anti-entangling devices can be found each looking for an effective way of avoiding entangling of the wire both during transport and its utilization, with the object of providing the desired productivity of the welding process by a controlled pay out of the wire. These have met with varying degrees of success.

An illustrative example of the prior art containers and anti-entangling devices is given by U.S. Pat. No. 6,875,521. This patent discloses a welding wire container and an anti-entangling device (identified as a retaining device 26) for packaging and unwinding coiled welding wire, wherein the retaining device is secured relative to the inner wall of the container by means of flexible strips 32 passing through outer peripheral openings 30 in said retaining device. The flexible strips are fixed to the wall at two vertically spaced points along the height of the welding wire coil.

The flexible strips do not touch the top part of the wire coil and therefore do not cooperate with the retaining device to modulate the movement of the wire during uncoiling of said wire. Instead, the strips only serve to orient the retaining device on top of the coil, to prevent the coiled wire from passing peripherally up past the retaining device, and to provide a guide path for the retaining device as it descends during pay out of the wire from the diminishing wire coil.

Other references related to this patent application are U.S. Pat. Nos. 5,105,943; 5,277,314; 5,758,834; 5,819,934; 8,985,495 and US 2006/0021893.

None of these references however describe an anti-entangling device which uniquely allows for an effective use of straps to provide an anti-entangling frictional force onto the wire loops located at the upper surface of a wire coil in the combination of such device with the wire container as provided by the present invention.

The cited references are hereby incorporated into this application by reference.

The need still exists for providing a cost-effective welding wire container and an improved anti-entangling device combination that overcomes the disadvantages and relative limitations of the containers and anti-entangling devices currently used in the industry.

OBJECTS OF THE INVENTION

It is therefore an object of the invention to provide a container for a welding wire coil comprising an anti-entangling device to prevent said wire from entangling.

It is another object of the invention to provide a container for a welding wire coil wherein said anti-entangling device cooperates with at least one flexible strap-like element, extending along the height of said coil, that is directed to contact at least partially an effective amount of, and with sufficient continuing force on, the upper surface of the welding wire coil to more reliably prevent entanglement of the welding wire, while the wire is being withdrawn through a first opening formed in said anti-entangling device.

Other objects of the invention will be evident from the description of the invention.

SUMMARY OF THE INVENTION

In general, the objects of the invention are achieved by providing a container for a coil of welding wire wherein said container includes the wire coil, an anti-entangling device positioned atop the wire coil and having a first opening (through which the welding wire is uncoiled) and further having at least one second opening which each cooperates with a respective one of at least one flexible strap-like element so that after extending along the height of the wire coil the respective at least one flexible strap-like element is then directed under the device to contact and bear down on at least a part of the upper surface of the welding wire coil, before extending on through the respective second opening in said anti-entangling device. Each at least one second opening is positioned preferably close to the anti-entangling device's first central opening. Preferably, there are a plurality of the flexible strap-like elements and the same number of respective second openings in the anti-entangling device; and the second openings are either equally spaced, or are opposingly placed, about the device's first central opening (such that the flexible strap-like elements are positioned by the second openings to also at least aid in holding the device in place on the wire coil).

The present invention is characterized by the fact that each of the at least one flexible strap-like element is forced to have contact with the wire loops on top of the wire coil and in this way, the flexible strap-like elements cooperate with the anti-entangling device to prevent entangling of the wire loops.

While in the prior art, flexible strips attached to the wall serve only as guides or means for positioning the anti-entangling device on the wire coil and do not have contact the top surface of the wire coil (because the position of the openings in the prior art anti-entangling device, through which those strips pass, are only at the outer periphery of the anti-entangling device).

None of the prior art known to applicant includes applicant's concept of applying downward force by means of flexible straps (or their functional equivalents) positioned to act directly onto the top surface of the wire coils; and in particular onto the individual loops forming the top surface of the wire coil, which straps are flexible and frictionally rough enough to grip and better resist against dragging the trailing loops out with, or even over, preceding loop(s) out of turn, whereby, even as the welding wire is being payed out, the straps continue to aid in avoiding uneven wire withdrawal and consequent entanglement(s).

More particularly, the objects of the invention can be achieved by a container enclosing a wire coil of welding wire formed of a plurality of layers of vertically-stacked wire loops and having a central open cavity, which comprise a base supporting said wire coil; a wall enclosing said wire coil, attached to said base, and having a height taller than the height of said wire coil; at least one flexible strap each having a first end attached to said base or said wall at a lower part of said wall, and a second end attached to an upper part of said wall; an anti-entangling device on top of the wire coil, having a first central opening being positioned to coordinate with said central open cavity of the wire coil to enable welding wire from the wire coil to readily pass through said first central opening when said welding wire is withdrawn from the container, and having at least one second opening, and through each such second opening a respective flexible strap tautly extends within said container from the attached first end, up between said wire coil and said wall, then through the respective second opening, and on to the attached second end, wherein said anti-entangling device remains free to descend by gravity when welding wire from said wire coil is payed out from said container; the container enclosing the wire coil further has each second opening in said anti-entangling device being positioned at least closer to the first central opening in the anti-entangling device than to the portion of the outer periphery of the anti-entangling device that aligns with the first central opening and with the respective second opening, such that each flexible strap, prior to extending through said respective second opening, first extends additionally under said anti-entangling device and over at least a portion of said wire loops that form the top surface of said wire coil thereby being positioned to enable the flexible straps to exert a continued frictional force on said portion of wire loops sufficient to effectively resist entanglement of the loops, and to further contain the wire coil, during pay out of the wire from the top of the wire coil via the first central opening.

The objects of the invention in its broader aspects can be achieved by a container kit having component parts capable of being combined into a container holding a wire coil, formed of a plurality of layers of vertically-stacked welding wire loops and having a central open cavity, useful for storage, shipment, and reliably paying out welding wire from the wire coil held in the container, which comprise a base; a wall attachable to said base having a height taller than the height of said wire coil; at least one flexible strap each having a first end attachable to said base (or said wall) at a lower part of said wall and second end attachable to said wall at an upper part of said wall; and an anti-entangling device adapted to rest on top of the wire coil when positioned in said container and having a first central opening, in the anti-entangling device, located so as to be able to coordinate with said central open cavity of the wire coil so that, when the anti-entangling device is positioned on the wire coil in the container, the welding wire from the wire coil can readily pass through the first central opening when welding wire is withdrawn from said container; and also having an at least one second opening to enable each of said at least one flexible strap to extend through such respective second opening, when such flexible strap has been attached to said wall after said wire coil is positioned in said container, so as to extend from the attached first end, up between said wire coil and said wall, through the respective second opening, and on to the attached second end, while remaining free to descend by gravity as welding wire from said wire coil is payed out from said container; said container kit further has each second opening in said anti-entangling device being positioned at least closer to the first central opening in the anti-entangling device than to the portion of the outer periphery of the anti-entangling device that aligns with the first central opening and with the respective second opening, such that each flexible strap, when attached to said wall after the anti-entangling device is positioned on top of the wire coil in said container, will extend additionally under said anti-entangling device and over at least a portion of said wire loops that form the top of said wire coil to effectively be able to resist entanglement of the loops, as well as more completely to retain the wire coil, during the pay out of the wire from the top of the wire coil via the first central opening.

The objects of the invention can also be achieved by an alternatively defined container enclosing a wire coil of welding wire formed of a plurality of layers of vertically-stacked welding wire loops with a central open cavity, which comprises a base supporting said wire coil; a wall enclosing said wire coil, attached to said base, and having a height taller than the height of said wire coil; at least one flexible strap, each having a first end attached to said base (or said wall) at a lower part of said wall, and having a second end attached to an upper part of said wall; an anti-entangling device, on top of the wire coil, and having a first central opening, being positioned to coordinate with said central open cavity of the wire coil to enable welding wire from the wire coil to readily pass through said first central opening when said wire is withdrawn from the container, and having at least one second opening, and through each such second opening a respective flexible strap tautly extends within said container from the attached first end, up between said wire coil and said wall, through the respective second opening, and to the attached second end; wherein the anti-entangling device remains free to descend by gravity as welding wire from said wire coil is payed out from said container; the container enclosing a wire coil further has the radial distance from the center of said first opening of the anti-entangling device to any specific second opening of the anti-entangling device being shorter than the radial distance extending from the center of said first opening to said wall of the container so as to include, and thus align with, said specific second opening; whereby prior to extending through a respective second opening, each flexible strap first extends additionally under said anti-entangling device and over at least a portion of said wire loops that form the top of said wire coil and is sufficiently taut to continually bear down on said portion wire loops to effectively resist entanglement of the loops, and to further contain the wire coil, during pay out of the wire from the top of the wire coil via the first central opening.

DETAILED DESCRIPTION OF THE INVENTION

Figure 1:
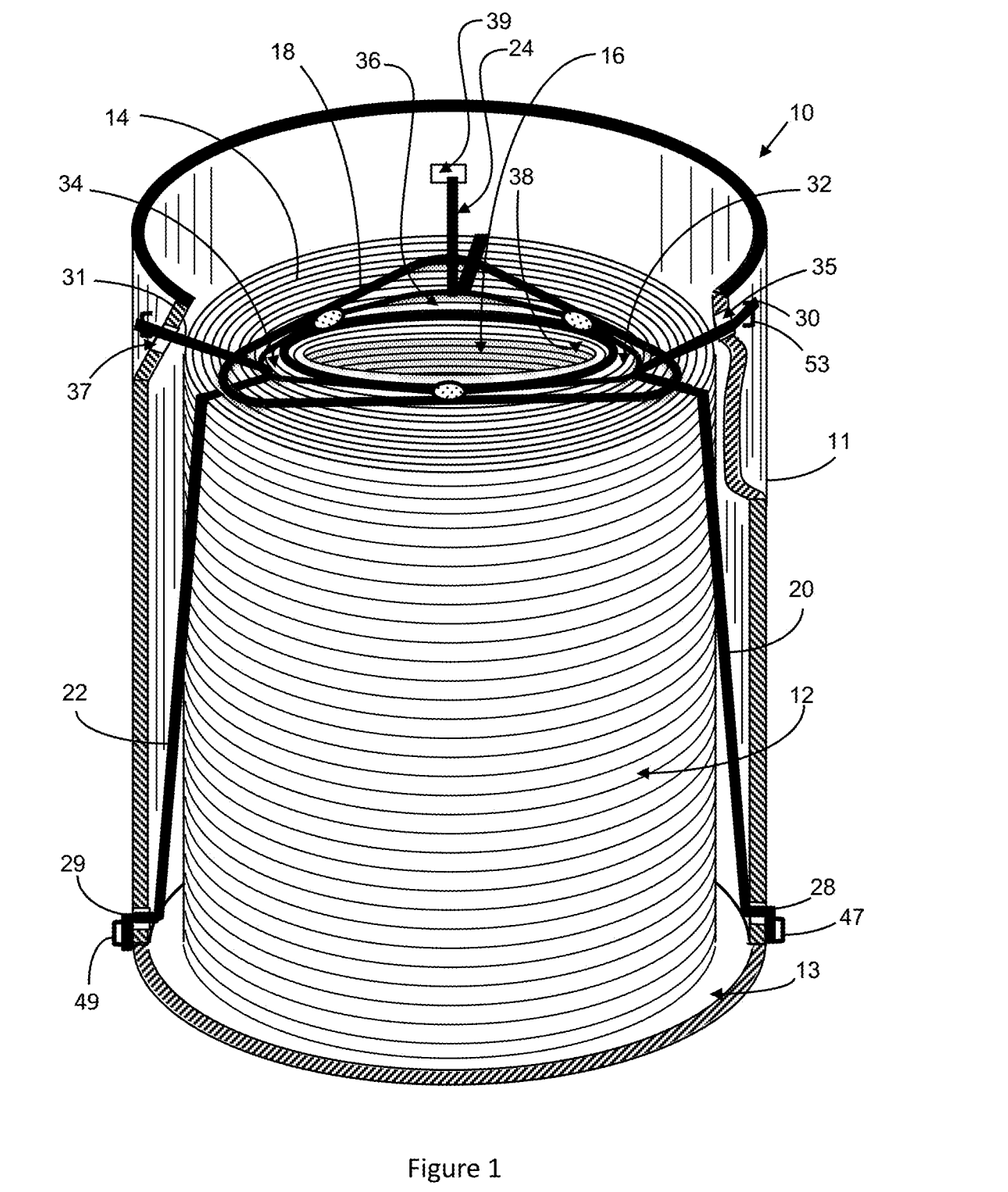
FIG. 1 is a diagrammatic perspective cut-view of one embodiment of the invention (wherein the cylindrical container wall is shown partially cut way to reveal the positioning and interaction of the wire coil retaining anti-entangling device with the flexible straps relative to the contained welding wire coil).

With reference to FIG. 1, an embodiment of the invention will be described with the understanding that the invention may be adapted to fit other particular applications without departing from the spirit and scope of the invention, which is defined in the appended claims.

To facilitate reading the description of one embodiment of the invention, like numerals are intended to designate like elements throughout all appended FIGS. 1 to 7.

Numeral 10 generally designates a container for welding wire herein illustrated having a cylindrical shape. But it will be understood that the container 10 may have any of a variety of cross sectional shapes, for example, polygonal (such as square, hexagonal, or octagonal), rectangular, elliptical, or other similar regular shapes, appropriate to containing the particular shape of the wire coil 12.

The container 10 has a lateral wall 11, partially shown to facilitate illustration of the inner structure, and a base 13, both forming the body of the container 10. The wall 11 has a height taller than the height of the wire coil 12. The container 10 is provided with a suitable closing cover (not shown to simplify the figure), that is intended to enclose the top of the welding wire coil and protect it.

A wire coil 12 is closely enclosed within said container forming a stack of wire loops 14 leaving a cylindrical central open cavity 16. An anti-entangling device 18 is placed on top of the wire coil 12 which device presses down the upper surface of the coil and which descends by gravity as the wire is withdrawn from said container 10 to be consumed by a welding machine (not shown).

In a preferred exemplary embodiment of the invention, three evenly separated flexible strap-like elements 20, 22 and 24 cooperate with the anti-entangling device 18 to create a frictional contact between said straps and the welding wire loops 14 that are located at the top of the wire coil 12. This can be enhanced to the degree needed by a proper choice of the material used for the straps 20, 22 and 24.

With reference to the two visible flexible straps 20 and 22, the first ends of each, 28 and 29, are each attached to the wall 11 at spaced points close to said base 13 and the respective second ends, 30 and 31, of said straps are attached to said wall 11 at the upper part and at a height above the height of the wire coil 12. The third strap 24 is attached to the wall 11, oriented similarly to straps 20 and 22 (see the upper end 33 of strap 24 visible particularly in FIGS. 3 & 4).

The straps may be affixed to the wall 11 by any suitable attaching means, for example gluing, stapling, or hook-and-loop.

For example, in FIG. 1 the straps 20, 22 extend through respective holes 41, 43 so that lower staples 47, 49 conveniently fix the respective lower first ends 28, 29 of each strap to the outside of wall 11 near or at the base 13. The straps 20, 22 extend in the opposite direction within the container 10 up and over the coil 12, through the respective second openings 32, 34 of the anti-entangling device 18 and back out of the container 11 through respective holes 35, 37 where upper staples 53, 55 fix the upper second ends 30, 31 of the straps 20, 22 to the conveniently-accessible outside of wall 11. The strap 24 (only the upper half of which, together with its upper second end 33 and its upper hole 39, are visible), will be understood to be similarly fixed in place with staples (not visible in the figures).

While the upper holes 35, 37, 39 (and the corresponding lower holes, e.g. 41, 43) are optional, they are helpful to more easily tension the straps 20, 22, 24, as they are fastened in place, to improve the straps' retention of the wire coil 12 in place and to additionally bear down on the top of the wire coil directly and via the anti-entangling device 18 (while still allowing the device 18 to descend as the welding wire 60 is payed out.

The number of straps may be varied and adapted to particular applications of the invention, depending on the geometrical shape of the wire coil and adaption of the invention to a particular application. The flexible strap-like elements 20, 22, 24 may be made of any flexible material, for example, cloth, cotton, nylon, rubber, plastics, polymers, etc. (preferably with a frictional surface for a better grip on the top loops sufficient to better resist tangling among such wire loop, without being excessive to be counter productive). In some embodiments, the flexible straps are made of an elastic material which exert some additional friction over the wire loops and ensure that the straps closely contact the wire loops at the upper part of the wire coil.

Figure 2:
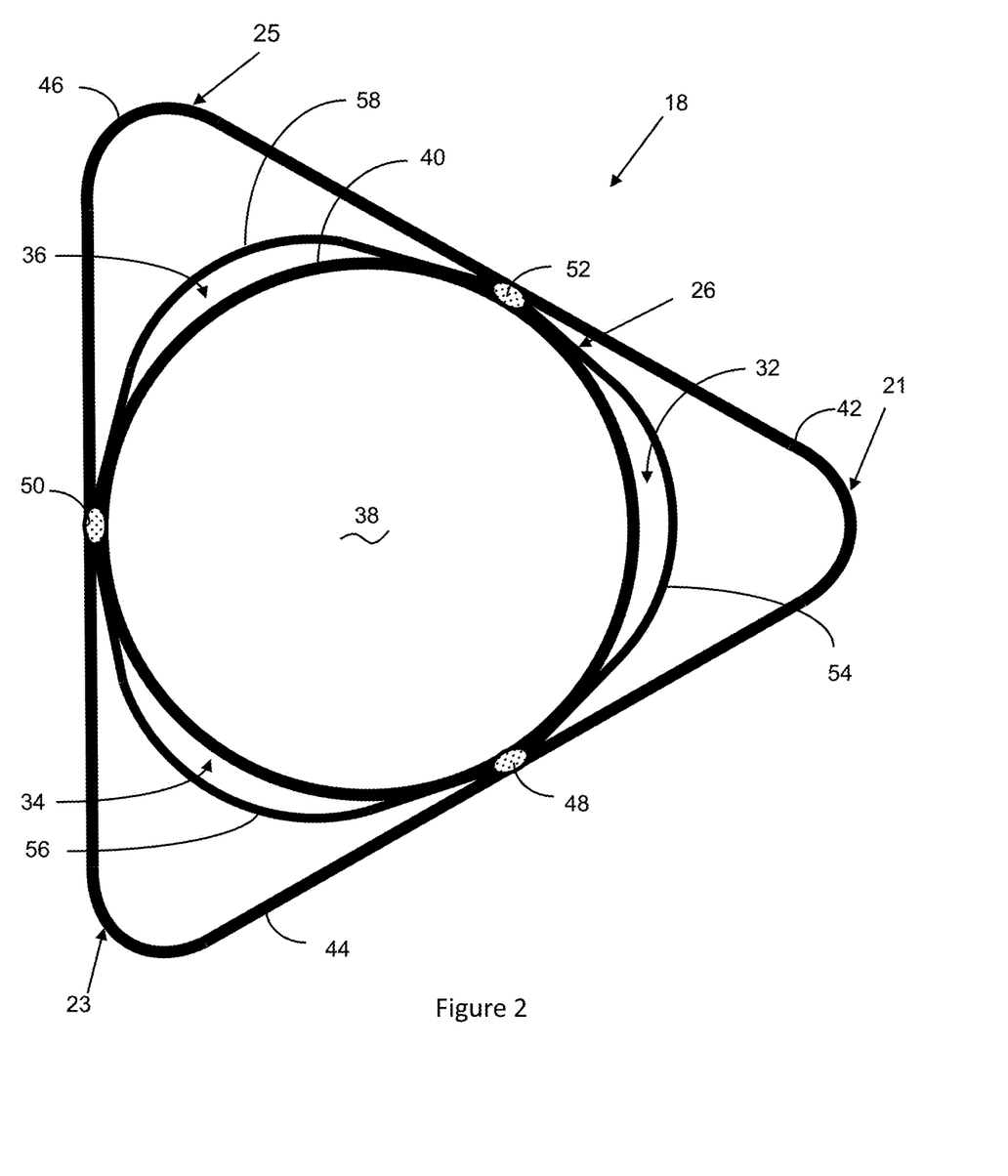
FIG. 2 is a diagrammatic plan view of a preferred embodiment of the wire coil retaining anti-entangling device (formed from wire rod).

According to the invention, as shown in FIG. 2, the flexible straps 20, 22 and 24 are caused to pass through openings 32, 34 and 36 respectively of the anti-entangling device 18 forcing said flexible straps 20, 22 and 24 to contact at least a portion of the wire loops 14 located at the upper part of the wire coil 12.

In an exemplary embodiment of the invention, the openings of the anti-entangling device 18 are formed of several wire elements attached to a central wire ring element 40. The anti-entangling device 18 and the flexible straps 20, 22, 24 cooperate for restraining the wire 60 forcing it to unwind from the upper part of the wire coil 12 in an orderly and smooth way and enable it to be withdrawn at high velocity through the first central opening 38 in said anti-entangling device 18. The diameter of the preferably circular first central opening 38 of the anti-entangling device 18 preferably closely matches, or is a little larger than, the diameter of the wire coil's cylindrical central open cavity 16; and the first central opening 38 and the central open cavity 16 are essentially concentric but may lose the concentric alignment without affecting the effectiveness of the anti-entangling effect. Also, advantageously a strict regularity of the stack of wire loops is not required in order for the straps to exert an effective anti-entangling frictional force onto the wire stack.

In the illustrated exemplary embodiment of the invention, as shown in FIG. 2, the anti-entangling device 18 made of wire rod comprises a ring-shaped first element 40 which defines the circular first central opening 38 for said wire 60 to pass there-through. A plurality of radially extending third elements 42, 44 and 46 are attached to said first element 40, for example by welding at points 48, 50 and 52, to extend radially to such a distance from the central point of said first ring-shaped element 40 as to cover preferably a major portion of the top surface of the wire coil 12 (and may extend almost to the inner surface of the wall 11 to aid in centering the first central opening 38 over the open cavity 16, but not bind against the wall 11). These radial extensions 42, 44 and 46 are herein illustrated as shaped in the form of rounded triangles but it will be understood that said extensions may have a variety of alternative shapes. Also welded to the wire ring 40 at points 48, 50 and 52 are three second elements in the form of wire arcs 54, 56, & 58. These arcs together with the wire ring 40 serve to form the anti-entangling device's second openings 32, 34, 36 (through which the straps 20, 22, & 24 are to be threaded, respectively). Advantageously, the arcs can be inexpensively formed by providing a wire ring (that is slightly larger than the wire ring 40) and is deformed enough to touch the ring 40 at three equidistant weld points 48, 50, & 52 (thereby forming the arcs 54, 56, & 58).

Whether the anti-entangling device 18 has three second openings 32, 34, 36, as illustrated, or four (or more), they preferably are equispaced about, and equispaced from, the first central opening.

Figure 3:
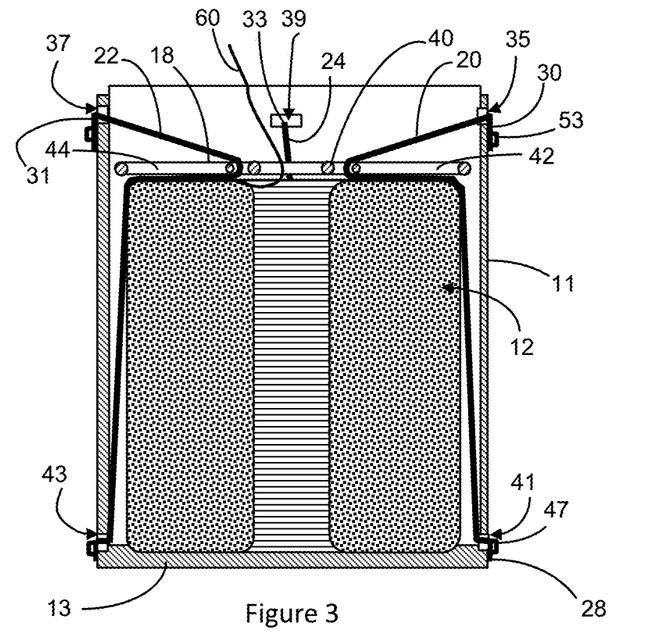
FIG. 3 is a diagrammatic side cut-view of the cylindrical container (sectioned along two of the vertically-oriented flexible straps, to include the container axis) showing in more detail the cooperative configuration of the flexible straps attached to said container as the straps extend under the anti-entangling device and over the top of the wire coil.

For a better understanding of the principle of the invention, FIG. 3 shows a diagrammatic side cut-view of the container 10, anti-entangling device 18 and flexible strap-like elements 20, 22 and 24 when the wire coil 12 is packaged but the wire 60 has not yet started to be consumed.

Figure 4:
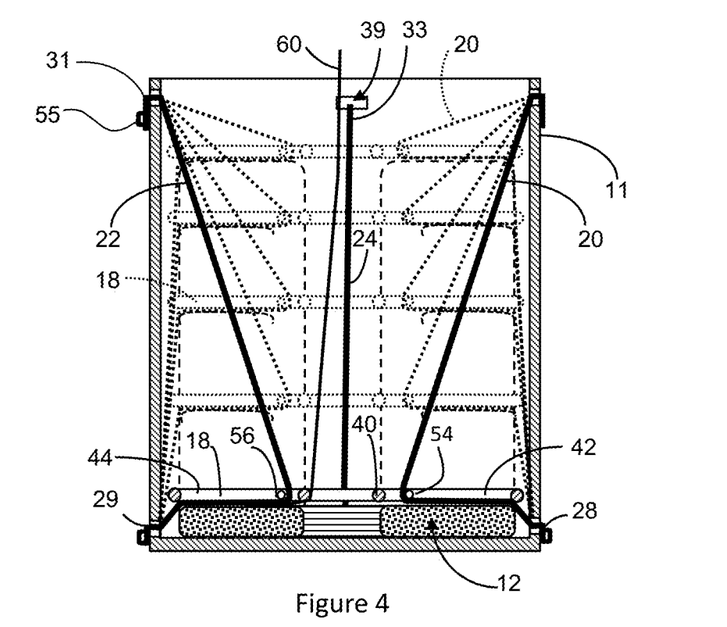
FIG. 4 is essentially the same view as in FIG. 3, modified to show the continued effective cooperation of the flexible straps during the repositioning of the anti-entangling device as the wire coil diminishes in size while the welding wire is being payed out and consumed.

FIG. 4 is a view, similar to FIG. 3, but modified to show with dotted lines several positions of the anti-entangling device 18, which descends by gravity in contact with the wire loops 14 at the top of the wire coil 12, and also to show the configuration of the flexible strap-like elements 20, 22, & 24 progressively in time as the welding wire 60 is withdrawn from said container 10. This is due to the position of the second openings 32, 34, and 36, in the anti-entangling device 18, that serve to force the flexible strap-like elements 20, 22, and 24 to always be in contact with an effective portion of the wire loops 14 across the top of the wire coil 12.

More specifically, according to the invention, each second opening 32, 34, & 36 in said anti-entangling device 18 is positioned at least closer to the periphery 26 of the first central opening 38 in the anti-entangling device 18 than to the outer respective peripheries 21, 23, & 25 of said anti-entangling device 18 (which peripheries 21, 23, 25 are in alignment with the first central opening and each respective second opening 32, 34, & 36). In other words, for example, the outer peripheral portion 21 is in alignment first with its respective second opening 32 and then with the first central opening 38.

With the anti-entangling device 18 positioned atop the wire coil in the container 10, this positioning of the second openings results in each second opening forcing its respective flexible strap to extend under said anti-entangling device and over at least a portion of said wire loops that form the top of said wire coil thereby being positioned to enable the flexible straps to exert a continued downward force on said portion of wire loops sufficient to effectively resist entanglement of the loops, and to further contain the wire coil, even during pay out of the wire from the top of the wire coil via the first central opening.

The combined container/wire coil embodiment of the invention can also be differentiated by the radial distance from the center of the circular first opening 38 of said anti-entangling device 18 to the second openings 32, 34, and 36 being each shorter than the respective longer radial distance from the center of the circular first opening 38 of the anti-entangling device 18 to the container wall 11, whereby the flexible strap-like elements 20 and 22 are forced to have contact with an effective portion of the wire loops 14 located at the top of the wire coil 12. Note that the radial distances to different second openings may differ in length. Thus is should be clear that for each second opening, each longer radial distance aligns with the corresponding shorter radial distance (and thus intersects with the specific second opening used to measure the first radial distance).

Figure 5:
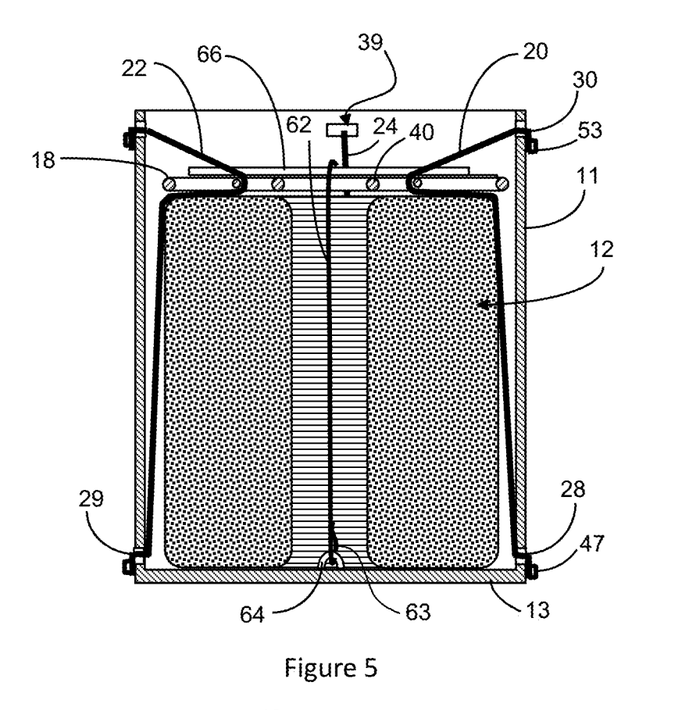
FIG. 5 is essentially the same view as in FIG. 3, modified to show an optionally added bar-like element and an elastic band (or spring) anchored to the bottom of the container to exert a downward pressure onto the anti-entangling device and consequently onto the wire coil to hold the coil even more securely in position during transportation.

FIG. 5 shows a diagrammatic side cut-view of the container 12 showing an exemplary embodiment of the invention wherein the anti-entangling device 18 is maintained more securely during transport on top of the wire coil 12, pressing down towards the base of the container by means of a band 62, which preferably, but not necessarily, has a degree of elasticity so that an additional force is exerted by the anti-entangling device on said wire coil 12. This band 62 may be made for example of rubber, an elastic polymer, or a textile material. One end of the band 62 is anchored to the base 13 of the container 10 by any suitable means, which has been illustrated in this exemplary embodiment for example as a ring or U-bolt 64 attached to the base 13. The other end of the band 62 is attached to a bar 66 having a length that overlaps the anti-entangling device 18 at least in one of its dimensions and therefore it presses down said anti-entangling device 18 which holds the coil of welding wire 12 and specially the wire loops at the top of the coil 12 in place while the container 10 is handled, transported and/or stored. The band 62 and the bar 66 are removed from the container before the container 10 is set up for the welding wire consumption.

Figure 6:
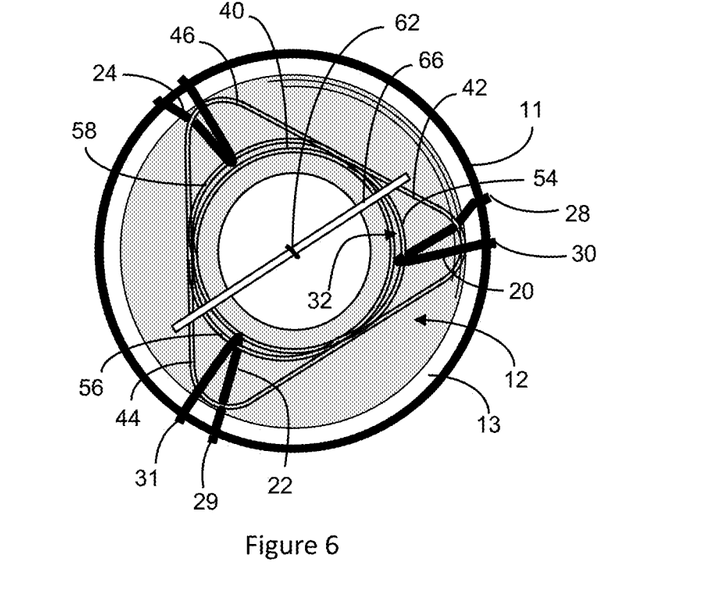
FIG. 6 is a diagrammatic plan view of the embodiment of shown in FIG. 5, (except modified so the three flexible straps are depicted somewhat askew from vertical, only for purposes of illustration, to better view in this figure how an upper portion of each flexible strap extends up over the anti-entangling device and a lower portion extends under the same device).

FIG. 6 shows a diagrammatic plan view of the container 12 illustrating the same embodiment of FIG. 5 to better illustrate the interaction of the bar 66, the band 62 and the anti-entangling device 18.

Figure 7:
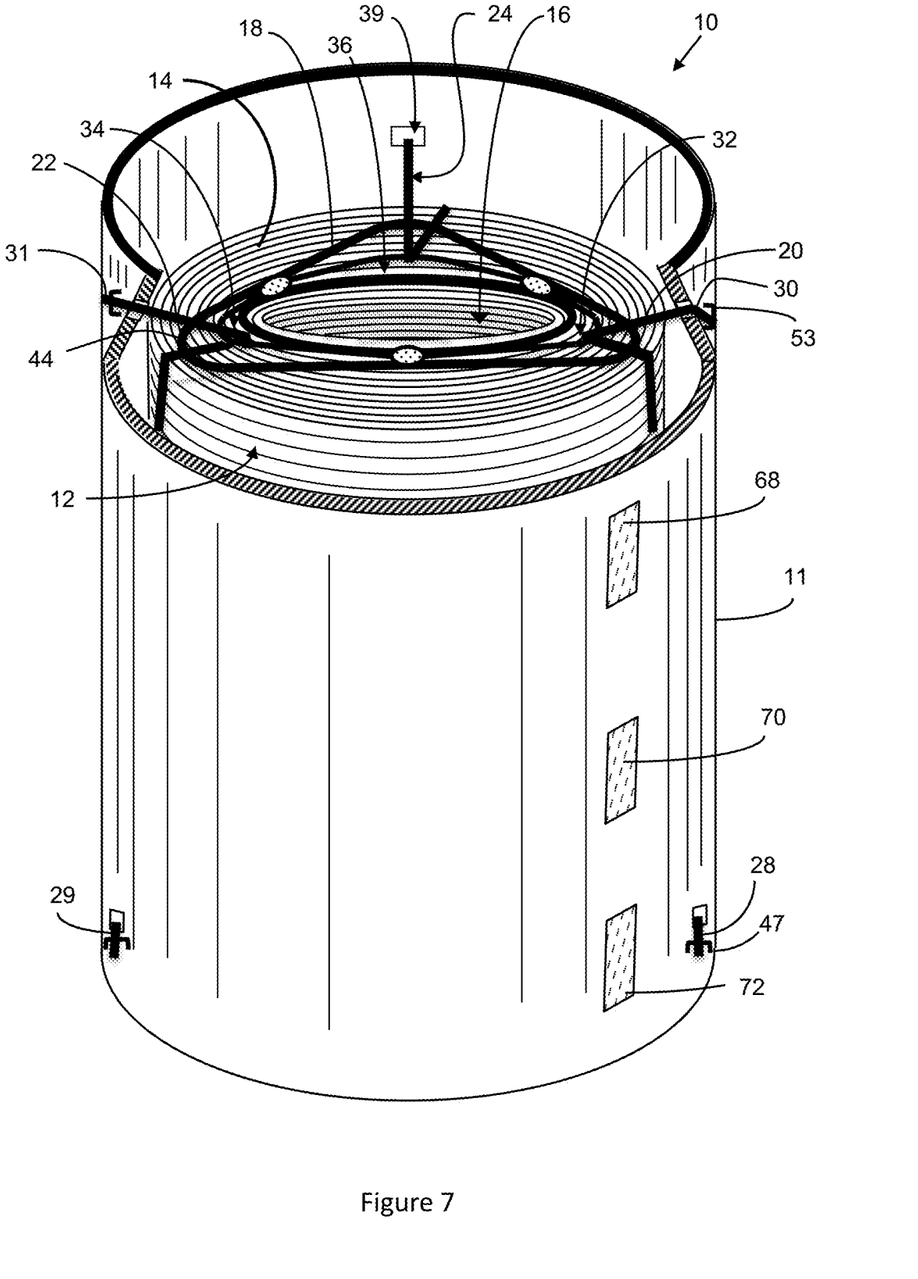
FIG. 7 is essentially the same view as in FIG. 1, modified to cut away only an upper portion of the container's exterior specifically to show, in the retained lower portion, three window openings used for visually determining the level of wire remaining in the container.

FIG. 7 shows how the container 10 can have one or several small sight apertures 68, 70 and 72 in the wall 11 covered with a transparent material, such as a transparent polymer, that are useful for an operator to determine the level of consumption of welding wire and in this way enable him to take the necessary measures to timely substitute an empty container with a new container having a new coil of welding wire.

According to the invention, the weight of the anti-entangling device is optionally selected so that the weight increases as the thickness of said welding wire increases, and decreases as the thickness of the welding wire decreases.

In an exemplary embodiment of the invention, the weight of said anti-entangling device is selected from the following values:

| Wire Rod Thickness (mil) | Weight of anti-entangling device (gr) |
| --- | --- |
| 0.35-0.45 | 325 |
| 0.52-0.61 | 891 |
| 0.62-0.78 | 1,406 |

It will be understood that the above description has been made for purposes of illustration as referred to a container for coiled welding wire, but that the invention can be used with advantages for packaging and handling coils of wire or filaments of other materials, and that the invention has been described with reference to some preferred embodiments for purposes of illustration, but that this description is not intended to limit the scope of the invention, which is defined in the appended claims. In this regard, the anti-entangling device 18 may take many different forms.

Figure 8:
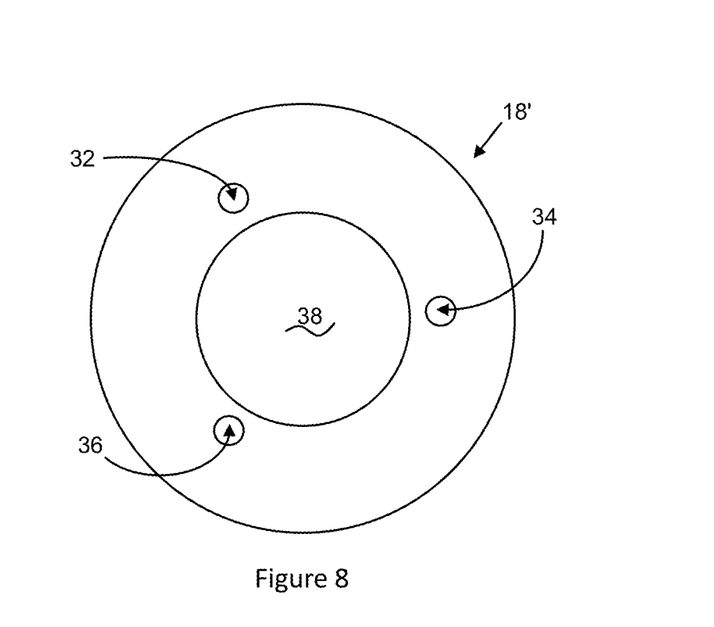
FIG. 8 is a diagrammatic plan view of another embodiment of the wire coil retaining anti-entangling device having a circular shape (optionally formed from an annular disk).

For example, a weighted annular disk 18', see FIG. 8, may be used in lieu of the bent wire rod anti-entangling device 18, illustrated in FIGS. 1-7. The annular disk 18' can be, for example, made of any suitable metallic, plastic, or polymer material. The hole in the center of the annular disk functions as the first central opening 38. Thus, it will be seen and understood that the each of the one or more second openings 32, 34 and 36 are positioned closer to the first central opening 38 in the anti-entangling device 18' than to the respective portion of the outer periphery of the anti-entangling device 18' that aligns with the first central opening 38 and with the respective second opening.

Figure 9:
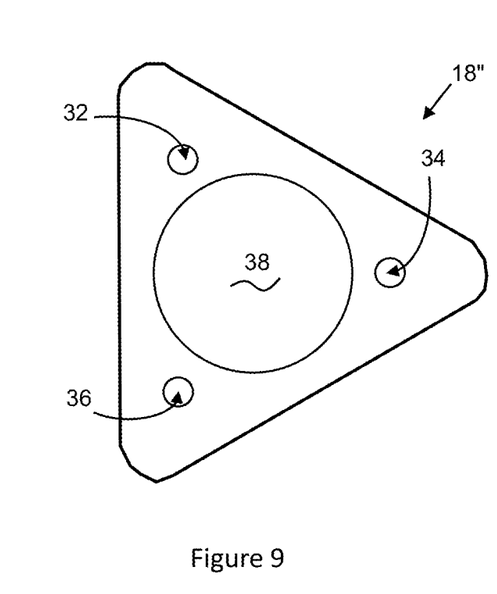
FIG. 9 is a diagrammatic plan view of another embodiment of the wire coil retaining anti-entangling device having a triangular shape.
Figure 10:
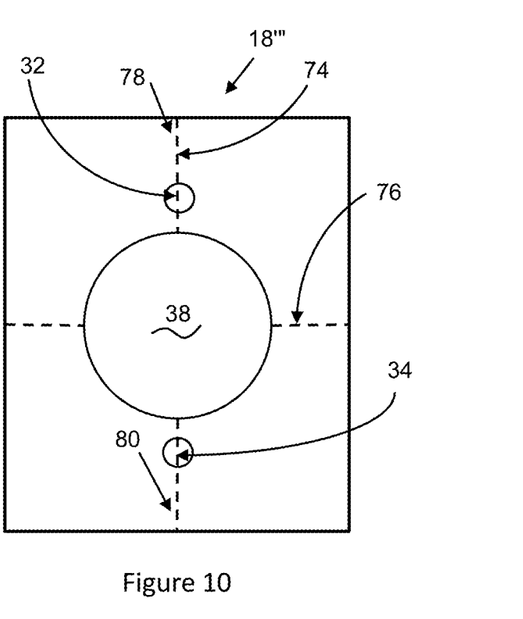
FIG. 10 is a diagrammatic plan view of another embodiment of the wire coil retaining anti-entangling device having a rectangular shape.

Similarly, a triangularly or rectangularly shaped anti-entangling device as shown in FIGS. 9 and 10 respectively may also be alternatively used.

In FIG. 9, anti-entangling device 18'' illustrates a more generic solid triangular form of than the bent wire embodiment in FIGS. 1-7.

18'''

With respect to FIG. 10, the first central opening 38 is shown preferably centered at about the intersection of the long and short axes of symmetry 74, 76 of the rectangular shape and the two second openings 32 and 34 are shown positioned on opposing sides of the first central opening 38, along the long axis of symmetry 74, each second opening being closer to the first central opening 38 than to the portion of the respective outer short-sided periphery 78 or 80 of the rectangularly shaped anti-entangling device 18''' which peripheral portion aligns with the first central opening 38 and with the respective second opening 32 or 34. The rectangular embodiment is not limited to two second openings 32 and 34. For example, two additional or alternative second openings can be opposingly located on the short axis of symmetry 76 or in pairs on parallel axes of symmetry, or any other effective numbers and dispositions of second openings that accord with the teachings of this application.

It is of course to be understood that in this specification only some preferred embodiments of the invention have been described for illustration purposes and that the scope of the invention is not limited by such described embodiments but only by the scope of the appended claims.

What is claimed is:

1. A container enclosing a wire coil of welding wire formed of a plurality of layers of vertically-stacked wire loops and having a central open cavity,
comprising
a base supporting said wire coil;
a wall enclosing said wire coil, attached to said base, and having a height taller than the height of said wire coil;
at least one flexible strap each having
a first end attached to said base or said wall at a lower part of said wall, and
a second end attached to an upper part of said wall;
an anti-entangling device on top of the wire coil, having
a first central opening positioned to coordinate with said central open cavity of the wire coil to enable welding wire from said wire coil to readily pass through said first central opening when said welding wire is withdrawn from the container, and having
at least one second opening, and through each such second opening a respective flexible strap tautly extends within said container from the attached first end, up between said wire coil and said wall, through the respective second opening, and to the attached second end, wherein said anti-entangling device remains free to descend by gravity when welding wire from said wire coil is payed out from said container;

said container enclosing a wire coil being characterized by:
  each of the at least one second opening in said anti-entangling device is positioned at least closer to the first central opening in the anti-entangling device than to the portion of the outer periphery of the anti-entangling device that aligns with the first central opening and with the respective second opening,
  whereby each flexible strap, prior to extending through the respective second opening, first extends additionally under said anti-entangling device and over at least a portion of said wire loops that form the top surface of said wire coil thereby being positioned to enable the flexible straps to exert a continued frictional force on said portion of wire loops sufficient to effectively resist entanglement of the wire loops, and to further contain the wire coil, during pay out of the wire from the top of the wire coil via the first central opening.

2. A container enclosing a wire coil of welding wire according to claim 1, further characterized by having a plurality of the flexible straps and the same number of respective second openings in the anti-entangling device; and by the second openings being oppositely placed, about the device's first central opening so that the flexible straps are positioned by the second openings to contact the top surface of the wire coil.

3. A container enclosing a wire coil of welding wire according to claim 2, being further characterized by the fact that the weight of said anti-entangling device is selected so that the weight of the anti-entangling device is heavier, if the thickness of said welding wire is wider, and the weight of said anti-entangling device is lighter if the thickness of the welding wire is narrower.

4. A container enclosing a wire coil of welding wire according to claim 3, being further characterized by the fact that the weight of said anti-entangling device is selected from the following values:

| Wire Rod Thickness (mils) | Weight of anti-entangling device (gr) |
| --- | --- |
| 0.35-0.45 | 325 |
| 0.52-0.61 | 891 |
| 0.62-0.78 | 1,406. |

5. A container enclosing a wire coil of welding wire according to claim 2, being further characterized by the anti-entangling device being formed from an annular disk.

6. A container enclosing a wire coil of welding wire according to claim 1, wherein said anti-entangling device is further characterized
  by a circular ring-shaped first element that defines the first central opening,
  by a plurality of second elements connected to the outside of said ring-shaped first element forming arcs that define the second openings, and
  by a plurality of third elements connected to the outside of said ring-shaped first element and radially extending therefrom outwardly toward the container wall and over said wire loops at the top of the wire coil;
  said elements being formed from wire rod.

7. A container enclosing a wire coil of welding wire according to claim 1, characterized by having said second openings being equispaced about, and equispaced from, said first central opening.

8. A container enclosing a wire coil of welding wire according to claim 7, further characterized by having three flexible straps, contacting the top surface of said wire coil, and three respective second openings.

9. A container enclosing a wire coil of welding wire according to claim 1, further characterized by said wall having a respective hole for the first end and also one for the second end of each of the at least one flexible strap pass through said holes in the container wall and are attached to said base or said wall by means of staples at points located at the outer surface of said base or said wall.

10. A container enclosing a wire coil of welding wire according to claim 1, further characterized by said first central opening of the anti-entangling device being concentric with said central open cavity of the wire coil.

11. A container enclosing a wire coil of welding wire according to claim 1, being further characterized by said container having a cross section of circular, polygonal, or rectangular shape.

12. A container enclosing a wire coil of welding wire according to claim 1, being further characterized by said anti-entangling device having a circular, triangular, or rectangular shape.

13. A container enclosing a wire coil of welding wire according to claim 1, being further characterized by the fact that said container is made of cardboard material.

14. A container enclosing a wire coil of welding wire according to claim 1, being further characterized by having at least one sight aperture in the lower part of said container wall.

15. A container enclosing a wire coil of welding wire formed of a plurality of layers of vertically-stacked wire loops with a central open cavity,
  comprising
    a base supporting said wire coil;
    a wall enclosing said wire coil, attached to said base, and having a height taller than the height of said wire coil;
    at least one flexible strap, each having
      a first end attached to said base or said wall at a lower part of said wall, and
      a second end attached to an upper part of said wall,
    an anti-entangling device on top of the wire coil, and having
      a first central opening being positioned to coordinate with said central open cavity of the wire coil to enable welding said wire from said wire coil to readily pass through said first central opening when said welding wire is withdrawn from the container, and having at least one second opening, and through each such second opening a respective flexible strap tautly extends within said container from the attached first end, up between said wire coil and said wall, through the respective second opening, and to the attached second end;
      wherein the anti-entangling device remains free to descend by gravity as welding wire from said wire coil is payed out from said container;
  the container enclosing a wire coil being characterized by:
    the radial distance from the center of said first opening of the anti-entangling device to any specific second opening of the anti-entangling device being shorter than the radial distance extending from the center of said first opening to said wall so as to include, and thus align with, said specific second opening,
    whereby prior to extending through a respective second opening, each flexible strap first extends additionally under said anti-entangling device and over at least a portion of said wire loops that form the top of said wire coil and is sufficiently taut to continually bear down on said portion wire loops to effectively resist entanglement of the loops, and to further contain the wire coil, during pay out of the wire from the top of the wire coil via the first central opening.

\* \* \* \* \*